Jan. 18, 1938.   P. H. DAVEY   2,106,085
POWER TAKE-OFF AND ASSOCIATED MECHANISM
Original Filed Dec. 18, 1933
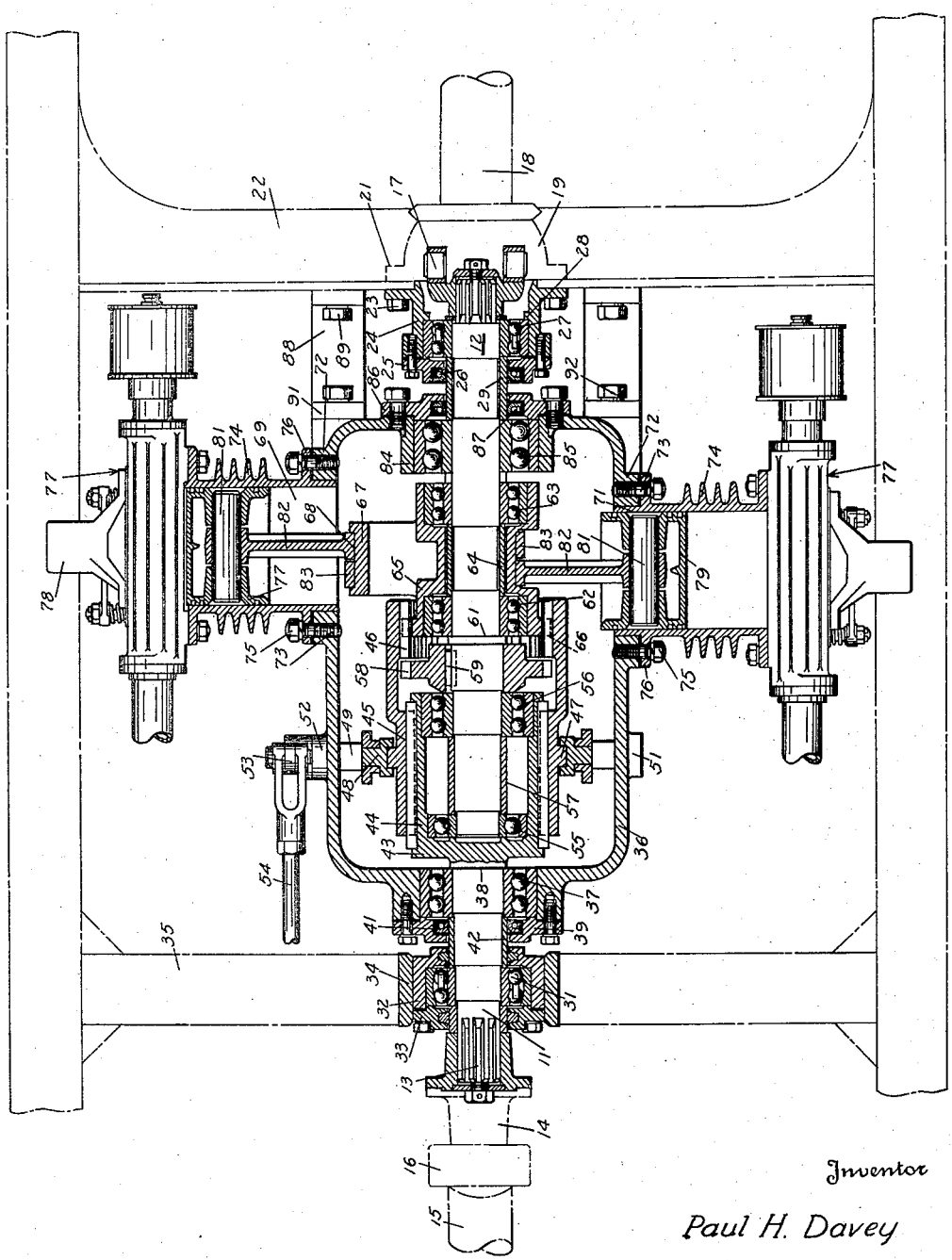
Inventor
Paul H. Davey
By Strauch & Hoffman
Attorneys Patented Jan. 18, 1938

2,106,085

UNITED STATES PATENT OFFICE 2,106,085

POWER TAKE-OFF AND ASSOCIATED MECHANISM

Paul H. Davey, Kent, Ohio

Original application December 18, 1933, Serial No. 702,993. Divided and this application March 26, 1936, Serial No. 71,017

6 Claims. (Cl. 180—53)

This invention relates generally to mechanisms employed in connection with power shafts to take off power for the operation of air compressors, welding generators and like power units, and more particularly to such mechanisms and their manner of mounting in connection with the drive shaft of a vehicle. This application is a division of my application Serial No. 702,993, entitled "Power Take-off and Associated Mechanism", filed on December 18, 1933 and issued as Patent No. 2,051,784 on August 18, 1936.

Prior mechanisms of this type have usually involved a support for the take-off device immediately upon the vehicle frame or chassis or on members attached thereto in a manner such that they become an integral part of the frame or chassis, a sliding gear construction in some cases being directly supported on a casing which amounts to a pillow block. In such constructions, the take-off unit is compelled to positively follow the truck frame or chassis in its weaving during road travel and as a result, the bearings and associated elements of the unit are subjected to undue stresses which materially decrease their life and increase the possibility of the unit becoming inoperative or breaking down at any time. Inasmuch as such a unit when employed in connection with automotive vehicles is generally used on remote jobs far from repair shops, it is evident that the dependability and long life thereof becomes an important factor in the overall efficiency of the vehicle and its attached unit or units.

My present invention, which is an improvement over the device disclosed in my Patent No. 2,014,797, issued September 17, 1935, overcomes this disadvantage of the prior art structures in that the drive shaft of the automotive vehicle which passes through the power take-off is substantially rigidly supported by the frame of the vehicle as is desirable, yet my improved take-off unit is mounted with the requisite flexibility to permit it to yield and accommodate itself to the weave of the vehicle frame during road travel and to the varying distortion of the vehicle frame under different loads. My improved take-off and its associated mechanism is also designed to transmit the full power available in the prime mover and readily adjust itself when put into operation when the supporting vehicle is so positioned that the frame thereof is distorted from normal alignment. This self adjustment is accomplished by the provision of self-aligning supporting means in connection with the power take-off whereby any reasonable amount of weaving and warping of the truck frame may take place without damage to the unit or its supporting bearings, and by novel internal construction permitting an overall contraction and expansion of the unit. My improved power take-off unit thus becomes an essentially independent transmission unit capable of self adjustment to varying positions relative to the truck frame, and has the further advantage that it frees the power take-off from the necessity of exact alignment with the drive shaft of a truck on which it is mounted, which has been an ever-present problem in the previous designs of such units. In most prior devices wherein the transmission mechanisms are confined to a supporting case, the size and arrangement of gears therein must of necessity be confined within definite limits which seriously limit the power that can be transmitted thereby, whereas with the present invention a relatively wide latitude is afforded in such selections. My present invention is also a marked improvement over the device disclosed in my prior application in that a more compact and less expensive assembly of mechanism for example, such as an air compressor and a power take-off device, is provided in a manner that leaves the full normal cargo space of the truck for use as desired.

Accordingly, it is a major object of my invention to provide a novel power take-off means through which the full prime mover power may be efficiently transmitted, that may be readily installed on automotive vehicles now in use or built into such vehicles in the course of construction thereof in a manner such that it may be considered an essentially independent transmission unit that will stand up under the shock of road travel, and weaving and distortion of the vehicle frame for a period considerably in excess of the usual life of prior units.

A further object of my invention is to provide a novel power take-off device that is supported in connection with the drive shaft of a truck or like vehicle through an arrangement whereby the necessity for exact alignment with the drive shaft is eliminated and the take-off is maintained in a semi-floating state whereby it may accommodate itself to distortion and weaving of the truck frame without the application of undue and harmful stresses to the bearings of the take-off or their associated structure.

Still a further object of my invention is to provide novel supporting means in connection with a power take-off unit on a truck drive shaft and truck frame, the supporting means being of a design to support the take-off in a semi-floating relation while yet supporting and maintaining the drive shaft in the preferred substantially rigid relation, thus permitting the take-off to yield and accommodate itself to weaving and warping of the truck frame during road travel and under different loads.

Another object of my invention is the provision of novel power take-off means in a novel combination with a power converting unit such as a compressor, generator or the like whereby the power converting unit and the take-off therefor may be so positioned with reference to the drive shaft and the frame that there is substantially no sacrifice of the original cargo space.

A further object of my invention is a novel combination of a power converting unit such as a compressor or generator and the like with a power take-off device whereby the combined unit may be positioned around the drive shaft of a vehicle and supported thereon and on the frame in a manner that permits of the self-alignment and accommodation of the unit to weaving and distortion of the truck frame and entails no sacrifice of cargo space.

A further object is the provision of a novel power take-off device for use particularly in connection with trucks, embodying a selective clutch and gear mechanism whereby the power from the drive shaft may be optionally directed either to a power converting unit, to the driving wheels of the truck, or both, novel supporting means from the truck frame and drive shaft being provided whereby the power take-off may yield to align itself in accordance with weaving of the truck frame during road travel while the drive shaft is maintained in its desired position.

My invention has as a further object the provision of novel power take-off means in combination with a selective clutch and gear mechanism, adapted to transmit the full available power of the prime mover, the whole being of compact design and capable of insertion in a drive shaft, countershaft or the like and being designed to yield to the distortion and flexing of such a shaft without resulting harm to the take-off means or a reduction in its efficiency.

Another object of my invention is the provision of a novel power take-off means designed to be positioned adjacent driving and driven shafts and mounted thereon for relative movement in such manner that exact alignment need not be maintained therebetween for proper and efficient operation, novel self-aligning supporting means being provided in connection with the take-off to permit a requisite amount of displacement to accommodate distortion of the basic support.

A further object of my invention is to provide a power take-off of novel design for employment with a sectional or split drive shaft, a novel manner of connecting and suppporting the adjacent shaft sections being utilized immediately adjacent the power take-off mounting whereby the reaction thereupon is taken by the split shaft with no consequent distortion by stresses that would tend to decrease the efficiency thereof or reduce its anti-friction characteristics.

Still a further object of my invention is to provide a novel manner of connecting sections of a split propeller shaft through properly lubricated anti-friction means whereby a power take-off may be mounted and driven thereon with no reduction in the power transmitting efficiency of the shaft as a result of the reaction of the power take-off, novel clutching elements being also provided between the propeller shaft and the power take-off at a point immediately adjacent the anti-friction means to further minimize the resultant reaction against the shaft.

A further object of my invention is the provision of a power take-off of novel design together with selective clutch and gear mechanism whereby the construction thereof and the supporting means therefor is such that a relatively wide latitude is afforded for choice in the size and arrangement of gears and the arrangement thereof with the clutching mechanism.

Still a further object of my invention is to provide a novel manner of mounting a power take-off on a truck now in use or during the manufacture thereof whereby existing elements of the frame are utilized to best advantage and the take-off is assured of a semi-floating relation thus affording its accommodation to weaving of the frame during road travel or distortion of the frame due to varying loads, the manner of mounting being relatively simple and inexpensive.

It is still a further object of my invention to provide a novel power take-off in combination with a drive shaft together with improved lubricating means whereby proper lubrication of all the moving parts and their bearings is assured with a resulting increase in life of the take-off.

With the above and other objects in view as will appear from the following description, reference is made to the accompanying drawing wherein the figure in the plan view in longitudinal diametric section is shown of a combined power take-off and power converting unit as associated with the drive shaft on a vehicle in accordance with the present invention.

In the single figure of the drawing, I have shown preferred embodiment of my invention wherein a power converting unit is mounted around a power take-off inserted in a suitable drive shaft, the over-all assembly being relatively compact, simple to assemble and disassemble, and mounted in combination with self-aligning means whereby the entire unit is supported in semi-floating relation with the frame of the truck and is able to yield and give to weaving and warping of the truck frame during road travel. It will be further noted that the novel character of this assembly avoids the necessity of power transmitting pulleys with a belt connected therebetween and affords a positive direct drive with substantially no loss of power and no requirement for continuous adjustment.

In the drawing, a drive shaft 11 is positioned substantially in alignment with a driven shaft 12, shaft 11 being connected through a spline and flange connection 13 with a shaft 14 coupled to a shaft 15 leading from a suitable source of power such as the transmission of a truck through a universal 16. Shaft 12 is splined to a fork 17 of a universal joint which connects with a shaft 18 leading to a unit to be driven, or in the case of a truck to the differential driving the wheels. Shafts 11, 12, and 15 thus comprise a sectional propeller shaft or a portion thereof which in the case of a truck transmits power from the engine or prime mover to the wheels. A cover 19 is suitably mounted on shaft 18 and connected by a flange 21 to a supporting cross member 22 on the truck frame. Connection of cover 19 to member 22 is obtained by cap screws 23 passing through suitable holes in member 22. Cap screws 23 also pass through suitable holes in a bearing support 24 to which an apertured cover plate 25 containing a grease retainer 26 is suitably bolted or otherwise fastened. A bearing 27 of the self-aligning type is supported by support 24 and held in place by a flange 28 and cover plate 25. It will be noted that the aperture in cover plate 25 is larger than an adjacent spacing collar 29 on shaft 12 whereby shaft 12 may be angularly displaced with reference to its normal axis and still not be unduly cramped and held in frictional engagement with portions of its related assembly whereby the efficiency of the unit may be reduced.

A self-aligning bearing 31 is provided in connection with shaft 11 and is supported in a bearing block 32 in turn provided with an apertured cover plate 33. Block 32 is suitably supported on a pillow block 34 suitably secured to a cross member 35 on the truck frame. Suitable means may be employed for the introduction of lubricant and lubricant retaining washers are preferably employed as illustrated in connection with both the bearing block and its cover plate.

A housing 36 of substantially cylindrical shape is provided around shafts 11 and 12 and supports a bearing 37, preferably of the ball type, at its left end to support shaft 11, bearing 37 being held in place by a shoulder 38 on shaft 11 and a cover plate 39 bolted or otherwise suitably secured to housing 36. Cover plate 39 supports a grease retainer 41 in contact with a collar 42 mounted on shaft 11 to space bearings 31 and 37.

Shaft 11 is formed with an integral flange 43 having a sleeve 44 integral therewith at its outer periphery, sleeve 44 being splined on its outer surface to engage complementary splines on the inner surface of a sliding sleeve 45 that is formed with an interior annular gear 46 at its right end. Sleeve 45 is formed with diametrically projecting pins 47 engaging the inner terminus 48 of an operating fork 49 pivotally mounted in housing 36 at 51 and 52 and connected to a lever 53 in connection with a connecting rod 54 leading to a lever or other operating means preferably in the cab of the truck or other vehicle.

Sleeve 44 has two bearings 55 and 56 therein, preferably of the ball type, and spaced apart by collar 57 on shaft 12. Shaft 12 is rotatably supported in these bearings and adjacent bearing 56 has a gear 58 suitably keyed thereto to rotate therewith at 59.

A shoulder 61 is formed on shaft 12 adjacent key 59 abutted by a bearing 62. Bearing 62 is spaced from a second bearing 63, by a spacing collar 64. Both bearings are preferably of the ball type. A sleeve 65 having a gear 66 at the left end thereof is mounted to rotate on bearings 62 and 63 and carries an eccentric 67 at its midportion, eccentric 67 being formed with an annular groove 68 therein.

It will be noted that gear 46 is of a size so that driving connection can be established between gears 58 and 66 whereby both the vehicle and power unit may be driven at the same time, or it is possible by shifting the sleeve 45 to the right or left to disengage either the driven shaft 12 or the gear 66 to drive either of the units separately.

Housing 36 is provided with two openings 69 and 71 therein, the axes of which are offset with respect to one another for a purpose to be later described. Flanges 72 are provided around openings 69 and 71 with threaded lugs 73 projecting therefrom. Cylinders 74 are suitably secured to flanges 72 by nuts 75 in conjunction with flanges 76 on the cylinders. Suitable valve control means, air inlet and outlets together with cooling means, all generally indicated at 77, are provided in connection with cylinders 74 but as they form no part of the present invention, a detailed description thereof is deemed unnecessary.

Pistons 79 are provided within cylinders 74 to compress the air therein and are connected through wrist pins 81 with connecting rods 82 to eccentric straps 83 operating in annular groove 68 in the eccentric or cam member 67. Straps 83 are located side by side, hence the necessity for openings 69 and 71 with their associated cylinders being slightly out of line with one another as heretofore described.

Housing 36 is provided at its right end with a flange 84 supporting a bearing 85 held in position by a cover plate 86 provided with a grease retainer 87 contacting with collar 29.

To prevent the compressor from exerting a tendency to rotate with the shaft upon which it is mounted, braces 88 are connected to frame member 22 through bolts 89 and to brackets 91 and housing 36 through bolts 92 or other suitable fastening means.

Lubrication for the self-aligning bearings may be supplied through suitable grease fittings while lubrication for the structure within housing 36 is preferably assured by a sump pump (not shown) thus assuring force feed to all moving parts.

In operating the combined power take-off and compressor of Figure 1, if it is desired to drive shaft 12 and in turn the driving wheels of the vehicle, sleeve 45 is shifted to the left until gear 46 engages gear 58 and is free of engagement with gear 66. Drive then takes place through shaft 11, flange 43, sleeve 44, sleeve 45, gear 46, gear 58, and key 59 to shaft 12. If it is desired to operate the air compressor alone, sleeve 45 is positioned as shown in Figure 1 with gear 46 engaging gear 66 and free of engagement with gear 48 whereupon drive takes place through shaft 11, flange 43, sleeve 44, sleeve 45, gear 46, gear 66, eccentric 67, straps 83, connecting rods 82 and wrist pins 81 to pistons 79. If it is desired to operate both the driving wheels and shaft 12 and the air compressor, sleeve 45 is shifted to a position where the gear 46 engages both gears 40 and gears 56, the respective chains of drive being as pointed out above.

The above described combination not only is compact and simple in construction but is also characterized by its efficiency in that transmission of power is accomplished with a minimum of intermediate agencies. Moreover, the entire assembly is so mounted by reason of the self-aligning bearings that it may readily accommodate itself to distortion of the truck frame and no cramping or destruction of the supporting bearings results.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automotive vehicle comprising; a propeller shaft comprising at least two sections with one section arranged to connect with the driving wheels of said vehicle; a compressor positioned on said vehicle comprising a cylinder and a piston therefor; a connecting rod and an eccentric strap connected to said piston; an eccentric associated with said strap and mounted on said propeller shaft; and means for optionally causing said propeller shaft to drive said eccentric or said driving wheels.

2. An automotive vehicle comprising; a propeller shaft comprising at least two sections with one section arranged to connect with the driving wheels of said vehicle; a compressor positioned on said vehicle comprising a cylinder and a piston therefor; a connecting rod and an eccentric strap connected to said piston; an eccentric associated with said strap and mounted on said propeller shaft; and means for optionally causing said propeller shaft to drive said eccentric or said driving wheels or both said eccentric and said driving wheels simultaneously.

3. An automotive vehicle comprising a drive shaft; a driven shaft arranged to connect said drive shaft with the driving wheels of said vehicle; a compressor positioned on said vehicle comprising a cylinder and a piston therefor; a connecting rod and an eccentric strap connected to said piston; an eccentric associated with said strap and mounted on said driven shaft; and means to optionally connect said drive shaft with either said driven shaft or said eccentric or with said driven shaft and said eccentric simultaneously.

4. In combination with a vehicle comprising a frame subject to stresses under working conditions effecting distortion and misalignment of the elements thereof; a driving shaft; a second shaft arranged to be connected to said driving shaft; means to mount said shafts on said frame comprising means to support said shafts in universal relation to said vehicle to insure free operation of said shafts despite said distortion and misalignment effected by stresses; mechanical means between said supporting means to maintain the axes of said shafts in fixed relation to one another; a compressor on said vehicle comprising a cylinder and piston; a connecting rod and an eccentric strap connected to said piston; and an eccentric connected with said strap and mounted with the axis of at least one of said shafts as the axis thereof.

5. In combination with a frame subject to stresses under working conditions effecting distortion and misalignment of the elements thereof; a driving shaft; a second shaft arranged to be connected to said driving shaft, means to mount said shafts on said frame comprising means to support said shafts in universal relation to said frame to insure free operation of said shafts despite said distortion and misalignment effected by stresses; a casing supported on said shafts to permit rotation of said shafts relative thereto; means associated with said casing and arranged to be connected to and receive power from said driving shaft; and means within said casing to optionally connect said driving shaft with said last means or said second shaft.

6. In combination with a frame subject to stresses under working conditions effecting distortion and misalignment of the elements thereof; a driving shaft; a second shaft arranged to be connected to said driving shaft; means to mount said shafts on said frame comprising means to support said shafts in universal relation to said frame to insure free operation of said shafts despite said distortion and misalignment effected by stresses; a casing bearingly supported on said shafts between said universal supporting means; means associated with said casing and arranged to be connected to and receive power from said driving shaft; and means within said casing to optionally connect said driving shaft with said last means or said second shaft.

PAUL H. DAVEY.